United States Patent [19]
Schuett et al.

[11] Patent Number: 5,148,771
[45] Date of Patent: Sep. 22, 1992

[54] VETERINARIAN INFECTIOUS WASTE CONTAINMENT SYSTEM

[76] Inventors: Daniel L. Schuett, 3278 Baldwin Rd., Metamora, Mich. 48455; John McIlmurray, 929 East Sutton Rd., Lapeer, Mich. 48446

[21] Appl. No.: 754,067

[22] Filed: Sep. 3, 1991

[51] Int. Cl.⁵ .................. A01K 1/01; A61D 11/00
[52] U.S. Cl. .......................... 119/17; 119/19; 119/158
[58] Field of Search .............. 119/17, 158, 19, 27

[56] References Cited

U.S. PATENT DOCUMENTS

| | | | |
|---|---|---|---|
| 2,523,615 | 9/1950 | Fell | 119/22 |
| 2,701,547 | 2/1955 | Shaw | 119/22 |
| 2,765,771 | 10/1956 | Kevorkian | 119/17 |
| 3,087,459 | 4/1963 | Droeck | 119/17 |
| 3,177,843 | 4/1965 | Rubricius | 119/17 |
| 3,220,383 | 11/1965 | Bruner | 119/17 |
| 3,292,582 | 12/1966 | Rubriceus | 119/17 |
| 3,822,873 | 7/1974 | Benny | 119/19 |
| 3,828,732 | 8/1974 | Hill et al. | 119/22 |
| 3,884,191 | 5/1975 | Stout | 119/158 |
| 3,905,333 | 9/1975 | Uhrig | 119/17 |
| 4,205,627 | 6/1980 | Buchanan | 119/19 |
| 4,730,876 | 3/1988 | Yoshikawa | 119/158 |
| 4,741,289 | 5/1988 | Blose | 119/158 |
| 4,838,204 | 6/1989 | Young | 119/17 |
| 4,869,206 | 9/1929 | Spina | 119/17 |
| 5,000,121 | 3/1991 | Daily | 119/17 |

Primary Examiner—Paul J. Hirsch
Attorney, Agent, or Firm—Gifford, Groh, Sprinkle et al.

[57] ABSTRACT

A veterinarian infectious waste containment system having an animal cage and a flushing system slidable thereinto, and a process for containing infectious waste. The flushing system has a stainless steel waste collection pan and a means for flushing mounted at the top of the waste collection pan. The flushing system has an inlet which is fluidly connected to a water supply and the waste collection pan has an outlet fluidly connected to a drain. The means for flushing comprises disassemblable piping sections having apertures for delivery of fluid by spray jets. The water supply can have disinfectant selectively added to it; after the animal waste has been removed from the waste collection pan, the waste collection pan itself can be selectively flushed with the water with disinfectant. A stainless steel shroud extends a portion of the way from the flusing system towards the top of the cage and fits against the stainless steel side walls of the cage. The shroud has shroud lips that rest on the top of the flushing system piping and the shroud lips cover the flushing system piping. An animal resting platform comprised of plastic-coated grating resides on the shroud lips covering the flushing system.

20 Claims, 2 Drawing Sheets

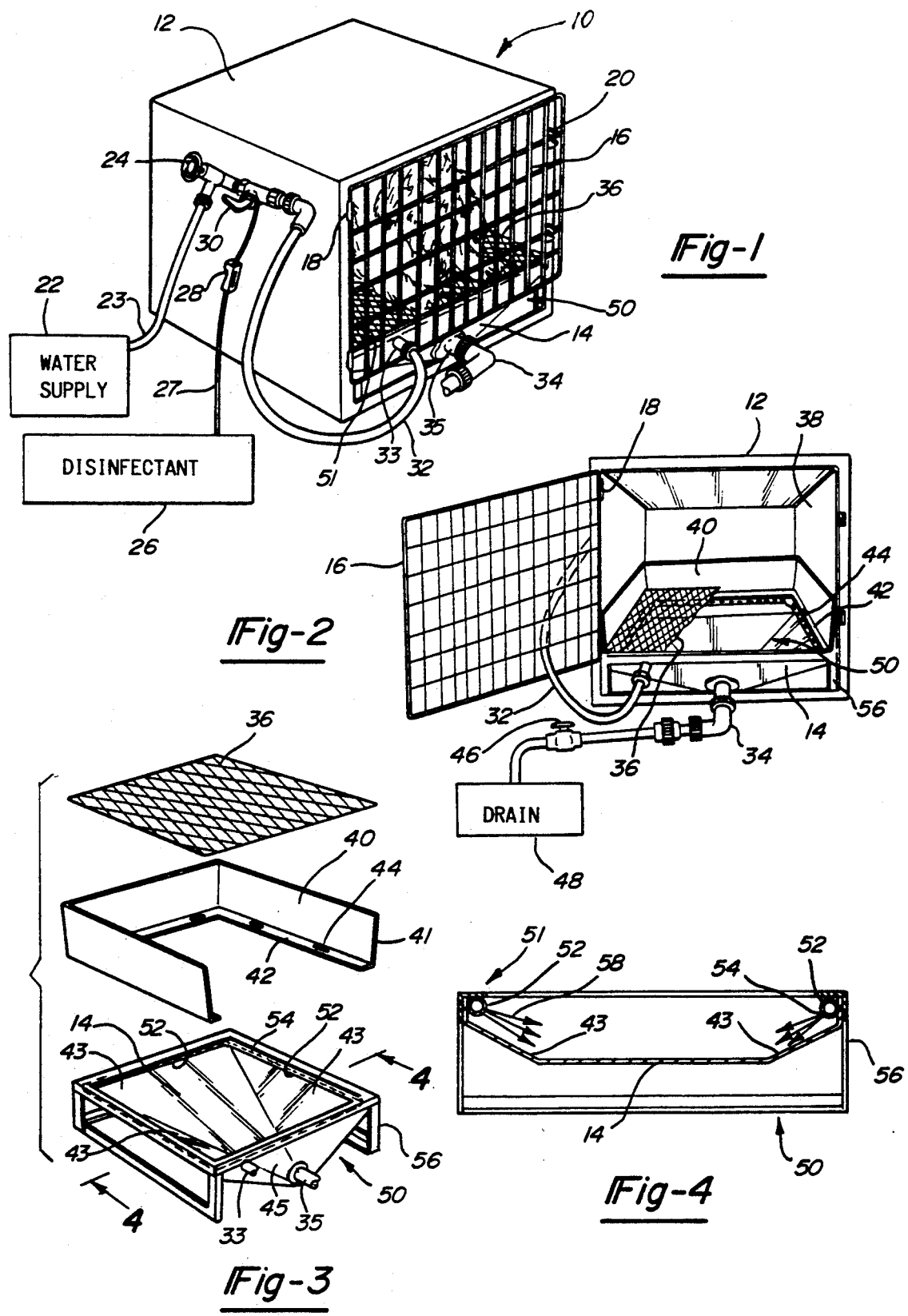

VETERINARIAN INFECTIOUS WASTE CONTAINMENT SYSTEM

BACKGROUND OF THE INVENTION

I. Field of the Invention

The present invention relates to animal cages. More particularly, the present invention relates to an animal cage and a process designed for cleaning an infected animal's cage in a veterinarian hospital, laboratory, zoo, or other animal holding facility.

II. Description of the Prior Art

Doctors of veterinary medicine have long sought suitable animal caging for use in a veterinarian hospital for housing an infected animal. Many viruses exist in the veterinarian hospital, laboratory, zoo, or other animal holding facility and can infect other animal patients already stressed and weakened by their own illnesses. Parvo virus is a commonly seen and easily transferable animal disease having infectious micro-organisms present in the excrement, vomitus or urine of an infected animal.

A conventional animal cage does not provide for cleaning of the cage. Since the early days of caging animals, cleaning of the cage has been necessary. The use of a standard animal cage, in which the animal is raised several inches from the floor of the cage, requires the animal to be removed to allow the cage to be thoroughly cleaned and sanitized. However, this type of cage is not convenient to clean when an animal becomes sick many times throughout the day. Clearly, the regular animal cage is limited in value in the circumstances discussed above.

In an effort to overcome the problems of known animal cages, several modifications of the basic animal cage have been attempted. An attempt to use a reverse flow of a large volume of relatively low pressure water for a flushing system is described in U.S. Pat. No. 3,828,732 to Hill et al. The flushing system for this animal cage discusses self-cleaning housing systems using front to back flushing systems that are feasible only for smaller animal housing systems, and only partially effective for large animal systems, such as for dogs.

Poultry droppings pans are described in U.S. Pat. No. 2,523,615 to Fell and U.S. Pat. No. 2,701,547 to Shaw.

A more recent attempt at cleaning an animal enclosure by flushing away waste material is described in U.S. Pat. No. 4,205,627 to Buchanan, June 3, 1980. This patent discusses controlling air flow by pressure so air is not recirculated through animal cages.

While providing some measure of cleaning, all these cleaning systems suffer from common defects, including the lack of the ability to disinfect the cage to control any infectious agent remaining after the flushing.

Accordingly, the problem of frequent cleaning of an infectious animal's cage has not been successfully addressed by prior invention.

The object of the present invention is to provide a veterinarian infectious waste containment system for use in veterinarian hospital, laboratory, zoo, or other animal holding facility that has the beneficial physical qualities of completely removing emitted waste from a sick animal patient and allowing for disinfection of the waste tray without disturbing the animal patient and, yet, has the ease of quick disassembly for thorough sanitation.

SUMMARY OF THE PRESENT INVENTION

The present invention overcomes these problems commonly associated with veterinarian infectious waste containment systems by providing a practical system that provides convenient removal as necessary of any animal emissions and easy sanitation after said removal. The present invention also provides for ease in total disassembly of the unit for complete cleaning and disinfection.

The veterinarian infectious containment system of the present invention includes an animal cage and a cage door hingedly attached to the cage. Latches are provided to readily fasten the cage door to the cage.

The cage itself has walls, a top and a bottom. Stainless steel walls comprise the interior. A flushing system is slid into place in the interior of the cage. An animal resting portion which is a plastic covered grate is located in a horizontal position on the flushing system. The flushing system comprises a stainless steel waste collection tray, means for flushing which is a water delivery system, an inlet, and an outlet. The water delivery system is connected to a water supply source and is controlled from outside the cage. A stainless steel shroud rising from the water delivery system and covering it extends above the animal resting portion and is angled to fit against the inside of the animal cage walls. The shroud directs emitted waste materials from the animal down into the waste collection pan and keeps them off the cage walls.

External to the cage, on the water delivery system, is a means for selectively delivering a disinfectant into the water supply prior to the water flushing system. The outlet from the tank drain contains a valve which allows the flushing water to build in volume in the tray prior to the valve being opened for removal. Because the animal cage can be quickly flushed as often as is required, which is every time the animal urinates, vomits or excretes; complete and time-consuming disassembly and cleaning is only required once during a shift at the veterinarian hospital. The infectious and non-infectious emittus, such as diarrhea, vomitus or urine, is removed immediately after being deposited by the animal, which keeps the animal and the cage cleaner. The almost immediate removal of waste reduces the likelihood of cross contaminating other animal patients and reduces the development of odors in the hospital. The fluidic ingress line can be disconnected at the inlet to the flushing system and used to spray the interior of the cage to wash down any infectious material. Additionally, the system can be easily converted to metabolically monitor the patient by measuring the volume of released fluids from the animal at a system outlet.

Other advantages and features of the present invention will become more apparent from the following detailed description when read in conjunction with the accompanying drawings.

BRIEF DESCRIPTION OF THE DRAWINGS

The present invention will be more fully understood by reference to the following detailed description of the preferred embodiments of the present invention when read in conjunction with the accompanying drawings in which like reference characters refer to like parts throughout the views, and in which:

FIG. 1 is a perspective view illustrating a veterinarian infectious containment system according to the present invention;

FIG. 2 is a perspective view of the interior of the veterinarian infectious containment system;

FIG. 3 is an exploded perspective view of the flushing system;

FIG. 4 is a sectional view of the flushing system of FIG. 3 taken along lines 4—4;

DETAILED DESCRIPTION OF THE PREFERRED EMBODIMENTS OF THE PRESENT INVENTION

Figure 5:
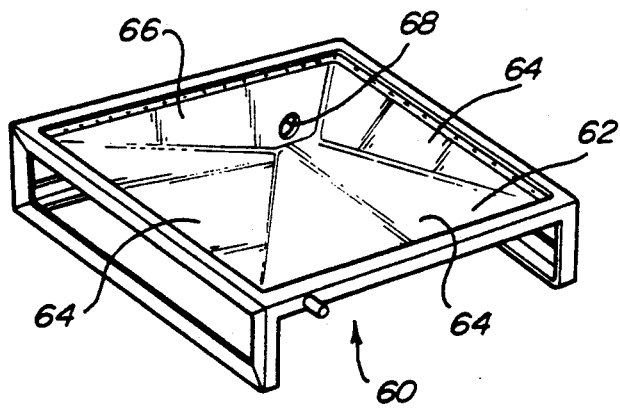
FIG. 5 is a first variation of a waste collection pan.

The drawing discloses the preferred embodiments of the present invention. While the configuration according to the illustrated embodiments are preferred, it is envisioned that alternate configurations of the present invention may be adopted without deviating from the invention as portrayed. The preferred embodiments are discussed hereafter.

With reference to FIG. 1, a veterinarian infectious waste containment system of the present invention is shown. The veterinarian infectious waste containment system, generally indicated as 10, comprises an animal cage 12 with a flushing system 50. The animal cage 12 has a closable cage door 16 mounted by hinges 18 to one side of cage 12. The closed cage door 16 opens externally and is shown in a closed position. A door lock 20 holds the cage door 16 in the closed position. The flushing system 50 comprises a waste collection pan 14, means for flushing 51, an inlet 33, and an outlet 35. A water supply 22 is connected to a water supply line 23 and is controlled by a water supply valve 24. The water supply line 23 is fluidly connected to the fluidic ingress line 32. Selective addition of disinfectant from container 26 through a disinfectant line 27 to the fluidic ingress line 32 is controlled by a metering device 28. The disinfectant line 27 is connected to the fluidic ingress line 32 by a valve 30. Valve 30 has two open positions, one for regular flow and the other position is a restricted flow causing a venturi effect on line 27 sucking disinfectant 26 into line 32. The fluidic ingress line 32 is fluidly connected to the inlet 33 of the flushing system 50. The means for flushing 51 flushes the waste collection pan 14 of the flushing system 50. An outlet 35 of the waste collection pan 14 is connected to a fluidic egress line 34 for the removal of accumulated fluid. An animal resting platform 36 is placed on top of the waste collection pan 14, as shall be further described.

FIG. 2 shows the animal cage 12 with the cage door 16 being open. The interior walls 38 of the cage are stainless steel. A shroud 40, also made of stainless steel, sits atop the waste collection pan 14 of the flushing system 50. The shroud 40 has shroud walls 41 which are tapered outwardly from shroud lips 42 to snugly engage the cage interior walls 38. The shroud lips 42 contain shroud spacers 44 for a purpose to be described. As is also shown in FIG. 2, the fluidic egress line 34 has a fluidic egress line valve 46 disposed between the fluidic egress line 34 and a drain 48.

FIG. 3 shows the flushing system 50. The flushing system 50 is comprised of disassemblable piping sections 52, which fluidly connect to the inlet 33. Apertures 54 are provided in the disassemblable piping sections 52. Risers 56 position the waste collection pan 14 having disassemblable piping sections 52 in the animal cage 12. The shroud 40 sits on the flushing system 50 with shroud lips 42 partially covering the disassemblable piping sections 52 of the flushing system 50. The animal resting platform 36, which is preferably plastic-coated steel grating of approximately 100 pound capacity, is placed on the shroud spacers 44 which hold the animal resting platform 36 above the shroud lips 42. The waste collection pan 14, shown in FIG. 3, has three contiguous planar pan surfaces, 43,43,43. The inlet 33 and the outlet 35 are positioned on a front wall 45 of the waste collection pan 14. The outlet 35 is positioned lower and centered in the front wall 45 of the waste collection pan 14. Disassemblable piping sections 52, having apertures 54, are fitted to the waste collection pan 14 and are fluidly connected to the inlet 33.

FIG. 4 shows a section of the flushing system 50 taken along lines 4—4 of FIG. 3. The disassemblable piping sections 52 are shown along the top of the waste collection pan 14. Spray jets of fluid, generally indicated as 58, are shown flowing from the apertures 54 of the disassemblable piping sections 52. Risers 56 set the height of the flushing system 50 when the flushing system 50 is inserted into the animal cage 12 as shown in FIG. 2.

FIG. 5 shows a first variation of a flushing system 60 with a second type of waste collection pan 62. The second type of waste collection pan 62 has three contiguous planar surfaces 64,64,64 which taper towards a back wall 66. An outlet 68 is mounted on the center bottom of the back wall 66.

Figure 6:
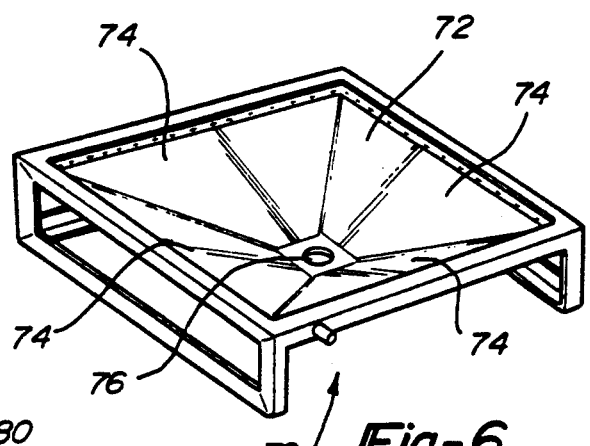
FIG. 6 is a perspective view of a second variation of a waste collection pan.

A second variation of a flushing system 70 is shown in FIG. 6. The second variation of the flushing system 70 uses a third type of waste collection pan 72 having four planar surfaces 74,74,74,74 intersecting at the lowest point in the middle of the waste collection pan 72 which also contains a centered outlet 76.

Figure 7:
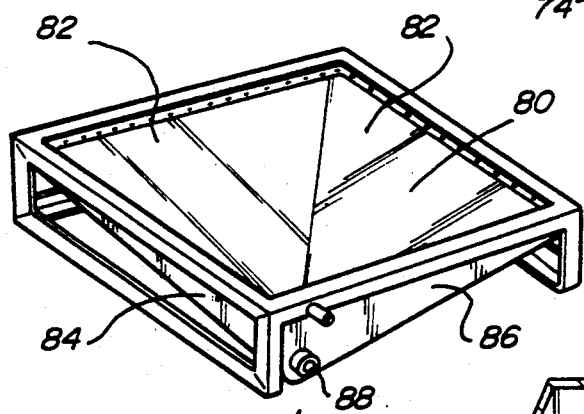
FIG. 7 is a perspective view of a third variation of a waste collection pan.

FIG. 7 shows a third variation of a flushing system 78 with a waste collection pan 80 that has two planar surfaces 82,82, a tapered side wall 84, and a tapered front wall 86. The outlet 88 is placed on the low point on the tapered front wall 86.

Figure 8:
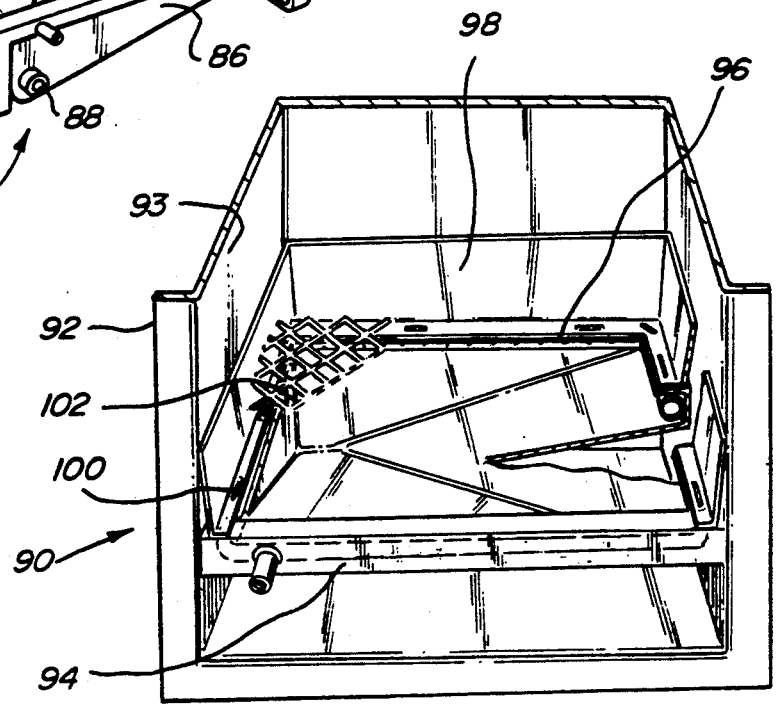
FIG. 8 is a perspective view, partially in section, of different embodiments of a veterinarian infectious waste containment system.

FIG. 8 illustrates an alternate embodiment of the present invention 90. According to this embodiment, an animal cage 92 has a waste collection pan 94 permanently mounted to the interior 93 of the animal cage 92. The flushing system 96 is placed into the waste collection pan 94 and a shroud 98 having shroud spacers 100 is positioned partially covering the flushing system 96. A water supply and disinfectant source (not shown) are used to frequently clean and disinfect the animal cage between thorough cleanings. The animal resting portion 102 is disposed on top of the shroud 98 and rests on the shroud spacers 100. The difference between this alternate embodiment and the prior embodiment being that the waste collection pan 94 is fixed permanently to the interior walls of the animal cage 92. The remainder of the composing elements of this embodiment are easily disassembled for thorough cleaning and disinfecting as in the earlier described embodiment.

Having described my invention, it is envisioned that modifications may be made which nevertheless fall within the scope of the invention, as claimed.

I claim:

1. A veterinarian infectious waste containment system for a sick animal comprising:

an animal cage having a closable cage door, an interior, and said interior of said animal cage having side walls;
a fluidic ingress line connected to a water supply;
a fluidic egress line connected to a drain;
a removable waste collection pan receivable in said animal cage, said waste collection pan connectable to said ingress line, having an inlet, an outlet connectable to said egress line, and means connected to said inlet for flushing said waste collection pan with water from said water supply received through said ingress line;
a shroud receivable in said animal cage, said shroud positionable on top of said waste collection pan and partially covering said interior side walls of said cage; and
an animal resting platform supported in said animal cage by said shroud.

2. The veterinarian infectious waste containment system of claim 1 further comprising:
valve means for controlling flow of fluid through said fluidic ingress line; and
valve means for controlling flow of fluid through said fluidic egress line.

3. The veterinarian infectious waste containment system of claim 1 wherein said means for flushing said waste collection pan comprises:
a plurality of piping sections having apertures;
said aperture of said piping sections comprising spray jets; and
said piping sections being fluidly interconnected for delivery of fluid by said spray jets to said waste collection pan.

4. The veterinarian infectious waste containment system of claim 1 wherein said animal resting platform comprises plastic-coated grating.

5. The veterinarian infectious waste containment system of claim 1 wherein said shroud has a top edge and a shroud lip resting on said waste collection pan, said shroud tapers outwardly from said shroud lip to said top edge.

6. The veterinarian infectious waste containment system of claim 3 wherein said piping sections are disassembleable.

7. The veterinarian infectious waste containment system of claim 1 wherein said waste collecting pan is supported on risers, said risers having lateral connecting rails.

8. The veterinarian infectious waste containment system as claimed in claim 3 further comprising:
valve means connected between said water supply line said ingress line for controlling water flow to said waste collection pan; and
said water supply line being disconnectable from said valve means.

9. The veterinarian infectious waste containment system of claim 6 wherein said shroud lip has shroud spacers fixedly joined to said shroud lip.

10. The veterinarian infectious waste containment system of claim 9 wherein said animal resting platform is supported above said shroud lip on said shroud spacers.

11. The veterinarian infectious waste containment system of claim 1 wherein said interior of said cage is comprised of stainless steel.

12. The veterinarian infectious waste containment system of claim 1 wherein said waste collection pan is a stainless steel waste collection pan.

13. The veterinarian infectious waste containment system of claim 1 wherein said shroud is a stainless steel shroud.

14. A veterinarian infectious waste containment system for a sick animal comprising:
an animal cage having a closable cage door, an interior, and said interior of said animal cage having side walls;
a fluidic ingress line;
a fluidic egress line;
a removable waste collection pan receivable in said animal cage, said waste collection pan connectable to said ingress line, having an inlet, an outlet connectable to said egress line, and means connected to said inlet for flushing waste from said removable waste collection pan;
a shroud positionable in said animal cage on top of said waste collection pan, said shroud partially covering said interior side walls of said cage;
an animal resting platform supported above said waste collection pan by said shroud;
valve means for controlling flow of fluid through said fluidic ingress line;
valve means for controlling flow of fluid through said fluidic egress line;
a disinfectant container for storing a disinfectant;
a disinfectant line connecting said disinfectant container to said fluidic ingress line for the delivery of said disinfectant from said disinfectant container to said fluidic ingress line;
means for metering delivery of said disinfectant in said disinfectant line; and
valve means for fluidically connecting and interrupting the flow of disinfectant from said disinfectant line to said fluidic ingress line.

15. The veterinarian infectious waste containment system of claim 14 wherein said waste collection pan has a plurality of contiguous planar surfaces.

16. The veterinarian infectious waste containment system of claim 15 wherein said plurality of contiguous planar surface are angularly disposed relative to each other.

17. The veterinarian infectious waste containment system of claim 16 wherein said waste collection pan has a lowest point, said outlet of said caste collection pan is near said lowest point of said waste collection pan.

18. The veterinarian infectious waste containment system of claim 17 wherein said inlet is located at a level above said outlet of said waste collection pan.

19. The veterinarian infectious waste containment system of claim 14 wherein said animal cage includes a lock for locking said closable cage door in a closed position.

20. A process for containing infectious waste in a veterinarian hospital comprising the steps of:
supplying water from a water supply source to a removable waste collection pan removable received in an animal cage, said waste collection pan having an inlet for receiving said water, an outlet, and a flushing system, for directing a water flow to flush waste from said waste collection pan;
selectively adding disinfectant to said water supplied to said removable waste collection pan;
flushing said removably received waste collection pan with said supplied water containing said disinfectant; and
draining said water and added disinfectant from said waste collection pan through an outlet.

* * * * *